US007005951B2

(12) United States Patent
Motooka et al.

(10) Patent No.: US 7,005,951 B2
(45) Date of Patent: Feb. 28, 2006

(54) SCREW-FIXING IMPLEMENT

(75) Inventors: Yutaka Motooka, Nagaokakyo (JP); Eiichi Kobayashi, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/474,327

(22) PCT Filed: Feb. 6, 2003

(86) PCT No.: PCT/JP03/01212

§ 371 (c)(1),
(2), (4) Date: Oct. 8, 2003

(87) PCT Pub. No.: WO03/069726

PCT Pub. Date: Aug. 21, 2003

(65) Prior Publication Data

US 2004/0113723 A1 Jun. 17, 2004

(30) Foreign Application Priority Data

Feb. 13, 2002 (JP) ............................ 2002-035883
Jan. 15, 2003 (JP) ............................ 2003-007356

(51) Int. Cl.
*H01P 7/00* (2006.01)
*F16B 39/24* (2006.01)

(52) U.S. Cl. ...................... 333/235; 333/202; 333/231; 411/533

(58) Field of Classification Search ................ 333/235, 333/202, 219, 219.1, 231–233, 223–226; 411/92, 102, 119, 533, 544
See application file for complete search history.

(56) References Cited

U.S. PATENT DOCUMENTS 2,619,145 A 11/1952 Poupitch
3,304,562 A 2/1967 Schmidt
3,351,116 A * 11/1967 Madsen ...................... 411/102
3,796,123 A * 3/1974 Duffy et al. ................ 411/427
4,140,870 A * 2/1979 Volkers et al. .............. 411/368
5,825,267 A * 10/1998 Smith ......................... 333/235
6,554,552 B1 * 4/2003 McKinlay ................... 411/149
6,734,766 B1 * 5/2004 Lye et al. ................... 333/203
2004/0057809 A1 * 3/2004 Nakagami ................... 411/368

FOREIGN PATENT DOCUMENTS

JP 62-98307 6/1987

(Continued)

*Primary Examiner*—Seungsook Ham
(74) *Attorney, Agent, or Firm*—Dickstein, Shapiro, Morin & Oshinsky, LLP.

(57) ABSTRACT

A screw-fixing implement which is low in cost and has a high reliability, a resonator device having the screw-fixing implement and having a characteristic adjusting function, a filter, an oscillator, and a communication device each containing the resonator device, and a method of adjusting a characteristic of the resonator device are provided. A nut 2 for fixing a characteristic-adjusting screw 1 is provided with a concave portion d in the vicinity to the axis of the fixing nut 2 and concaved in the thickness direction. A spring-washer 3 is provided with a convex portion p which is engaged with the concave portion d of the screw-fixing nut 2. The spring-washer 3 is sandwiched between a panel 4 and the screw-fixing nut 2. Then, the characteristic adjusting screw 1 is turned under an appropriate load. After the characteristic is adjusted, the screw-fixing nut 2 is tightened till the spring washer 3 is completely broken. Thus, these members are locked.

10 Claims, 8 Drawing Sheets

FOREIGN PATENT DOCUMENTS

| | | | |
|---|---|---|---|
| JP | 4-64816 | | 6/1992 |
| JP | 05-226913 | | 9/1993 |
| JP | 7-42722 | | 2/1995 |
| JP | 8-293710 | | 11/1996 |
| JP | 8-296776 | | 11/1996 |
| WO | WO 01/65631 | A1 | 9/2001 |
| WO | 200255893 | A1 * | 7/2002 |

* cited by examiner

SCREW-FIXING IMPLEMENT

TECHNICAL FIELD

The present invention relates to a resonator device having a characteristic-adjusting screw capable of being inserted into or extracted from a resonant space, or capable of being separated from or reaching a resonator, a filter, an oscillator, and a communication device each containing the resonator device, and a method of adjusting a characteristic of the resonator device.

BACKGROUND ART

Resonator devices with characteristic-adjusting screws have been disclosed in the below-described Patent Documents 1 to 4.

The device of Patent Document 1 uses a fixing nut with a spring washer, and the nut is engaged with a characteristic-adjusting screw. The nut is tightened by means of a rotary wrench provided with a torque-sensor, so that the nut has a torque at which the characteristic-adjusting screw can be turned to a slight degree. In this state, the characteristic-adjusting screw is tightened, and thereafter, the nut is locked.

In the device of Patent Document 2, a spring-washer becomes effective in the initial state. When a characteristic-adjusting screw is turned, a fixing nut is pressed by means of a rubber having a nut-turning piece inside thereof, so that the pressure of the spring-washer is cancelled out.

In the devices of Patent Documents 3 and 4, no fixing nuts are used. The characteristic-adjusting screw is fixed only by the spring washer.

According to the known technique disclosed in the below-described Patent Document 5, a case is burring-worked, and a characteristic-engaging screw is engaged with the burring-case.

Patent Document 1: Japanese Unexamined Patent Application Publication No. 5-226913

Patent Document 2: Japanese Unexamined Patent Application Publication No. 7-42722

Patent Document 3: Japanese Unexamined Utility Model Registration Application Publication No. 4-64816

Patent Document 4: Japanese Unexamined Patent Application Publication No. 8-293710

Patent Document 5: Japanese Unexamined Utility Model Registration Application Publication No. 62-98307

Referring to the device of Patent Document 1, it is required to provide an angle-detecting mechanism (image sensor) for the fixing nut and the torque sensor. Thus, as a whole, the characteristic-adjusting device becomes complicate and expensive.

In the device of Patent Document 2, a plate for fixing the characteristic adjusting screw must have such strength that the plate is durable to a pressing force applied when the nut is turned. Thus, the plate needs to be thick. The nut is locked only by the action of the spring washer. Therefore, in some cases, the reliability may become doubtful.

The devices of Patent Documents 3 and 4 have the following problems: the range in which the characteristic of each device can be adjusted is restricted on the stroke of a spring-washer; and moreover, if the load is changed during adjustment, the device becomes unstable in the state that the nut is not locked.

In the device of Patent Document 5, the screw is ready to be vibrated on its axis, since only the burring is carried out. Thus, automated adjustment becomes difficult.

Generally, the above-described problems occur not only in resonator devices but also in screws which are screwed into tapped holes formed in members to be held easily and securely at predetermined insertion or extraction positions.

It is an object of the present invention to provide a screw fixing-implement which solves the above-described problems, a resonator device with the implement of which the cost is low and the characteristic-adjusting function has a high reliability, a filter, an oscillator, and a communication device each containing the resonator device, and a method of adjusting a characteristic of the resonator device.

DISCLOSURE OF INVENTION

The screw-fixing implement of the present invention comprises a screw-fixing nut to be engaged with a screw screwed in a tapped hole formed in a member, the nut having a concave portion concaved in the thickness direction near the screw-axis, and a spring-washer having a piece with a spring-property which is in contact with the member, the spring-washer also having a convex portion engaged with the concave portion and being sandwiched between the member and the nut.

The resonator device of the present invention is characterized in that the device contains the screw-fixing implement, the member is a panel covering an opening of a cavity containing a resonator or a cavity of which the inside is a resonance space, and the screw is a characteristic-adjusting screw capable of approaching or being separated from the resonator, or capable of being inserted in or extracted from the resonance space of the cavity.

The method of adjusting a characteristic of the resonator device of the present invention comprises, in the resonator device having the above-described constitution, adjusting the tightening torque of the nut so that a load applied to the washer is such that the characteristic adjusting screw is not stuck, and the backlash of the screw can be absorbed, and in this state, turning the characteristic-adjusting screw.

Moreover, the method of adjusting a characteristic of the resonator device of the present invention is characterized in that an engaging member is attached to be engaged with the outer periphery of the nut and suppress the nut from being turned, and the characteristic-adjusting screw is turned.

Moreover, the method of adjusting a characteristic of the resonator device is characterized in that after the adjustment of the characteristic, the nut is tightened till the spring washer is completely broken.

The filter of the present invention is provided with an external input-output means coupled to the resonator or the resonance space of the above-described resonator device.

The oscillator of the present invention comprises an oscillation element coupled to the resonator or the resonance space of the above-described resonator device, and means of outputting an oscillation signal generated by the oscillation element.

The communication device of the present invention is provided with the above-described filter or oscillator.

BEST MODE OF CARRYING OUT THE INVENTION

The configuration of a resonator device according to a first embodiment and a method of adjusting a characteristic of the resonator device will be described with reference to FIGS. 1 to 3.

Figure 1:
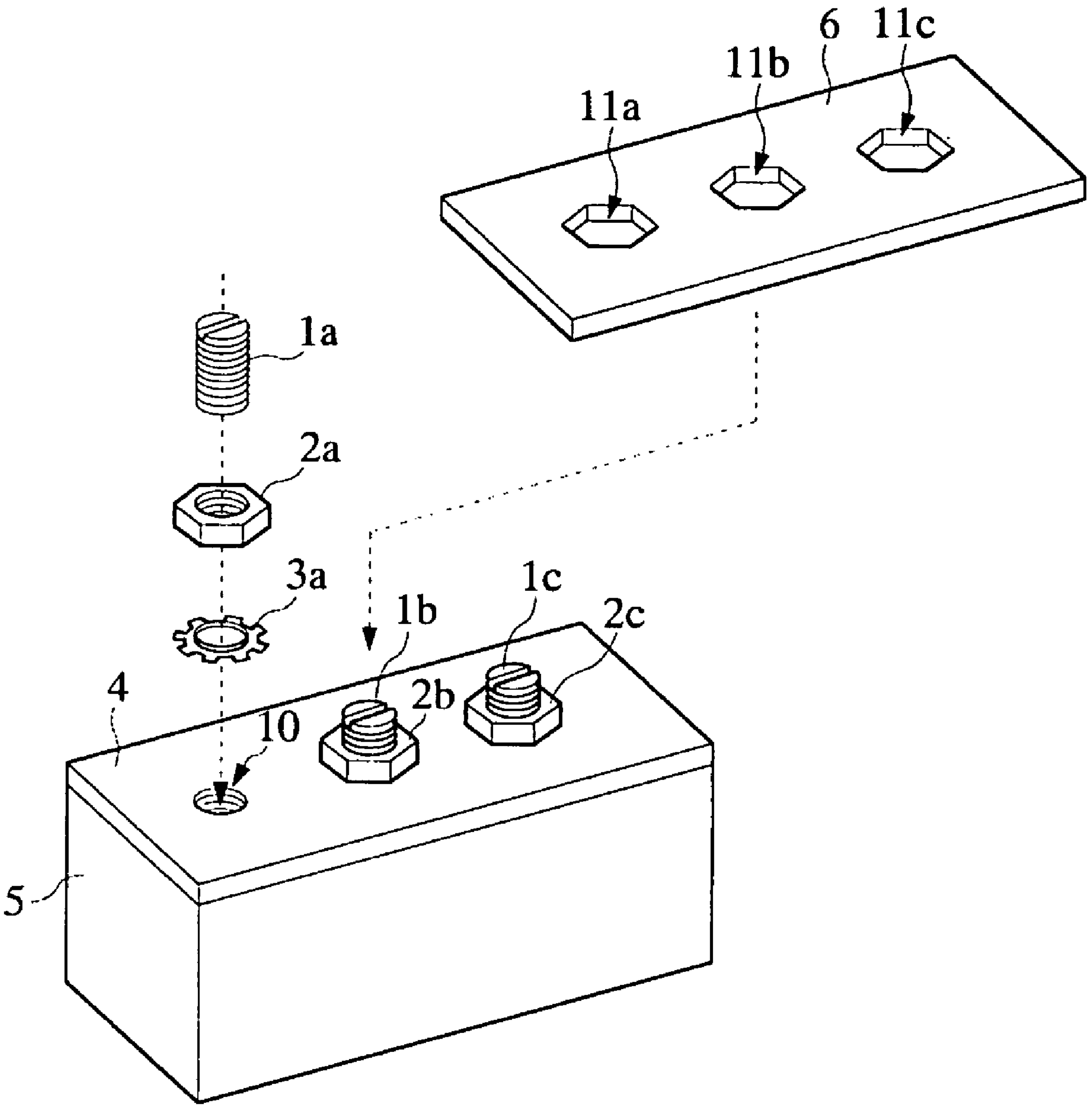
FIG. 1 is a partially exploded perspective view of a resonator device according to a first embodiment.
Figure 2A:
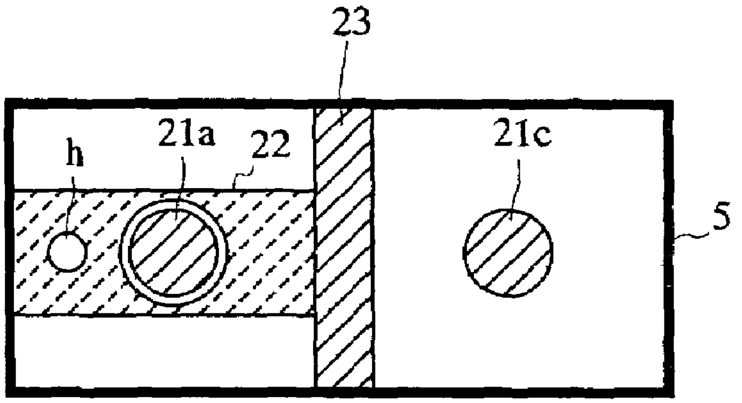
FIG. 2 shows, in cross-sections, the resonator device of the first embodiment.
Figure 2B:
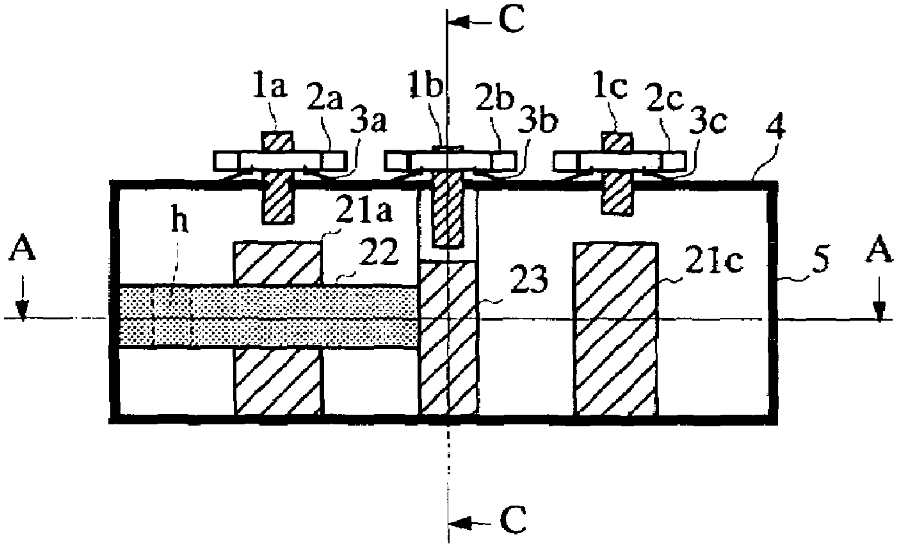
Figure 2C:
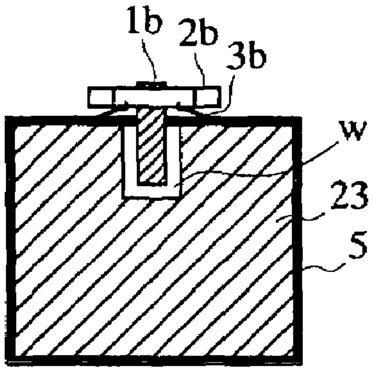

FIG. 1 is a partially exploded perspective view of the resonator device. FIG. 2 shows, in cross-sections, the resonator device. FIG. 2(B) is a central longitudinal cross-sectional view. FIG. 2(A) is a cross-sectional view of the part of the device taken along line A—A in FIG. 2(B). FIG. 2(C) is a cross-sectional view of the part of the device taken along line C—C in FIG. 2(B).

In FIG. 1, a cavity 5 and a panel 4 for covering an opening on the upper surface of the cavity 5 are shown. A conductor wall 23 is provided in the center of the inside of the cavity 5, and two core conductors 21*a* and 21*c* are formed inside of the cavity 5 so as to be protruded from the bottom of the cavity 5 toward the opening surface side thereof, as shown in FIG. 2. These two core conductors 21*a* and 21*c*, the cavity 5, and the panel 4 constitute two semi-coaxial resonators. A coupling window w is formed in the conductor wall 23 to couple the two semi-coaxial conductors to each other to a predetermined coupling degree.

Moreover, a dielectric core 22 is provided inside of the cavity 5 to constitute a TM mode dielectric resonator. A hole h is formed in the dielectric core 22, so that the symmetry of the electric field strength of the semi-coaxial resonator containing the core conductor 21*a* with that of the dielectric resonator containing the dielectric core 22 is broken. Thus, the two resonators are coupled to each other.

An external coupling means coupled to the dielectric resonator containing the dielectric core 22 and an external coupling means coupled to the dielectric resonator containing the core conductor 21*c* are provided, though not shown in FIGS. 1 and 2. Thus, the three-stage resonators are formed between the two external coupling means.

Tapped holes 10 are formed in the panel 4, and the characteristic-adjusting screws 1*a*, 1*b*, and 1*c* are screwed in the tapped holes 10, respectively. Screw-fixing nuts 2*a*, 2*b*, and 2*c* are provided are engaged with the characteristic adjusting screws 1*a*, 1*b*, and 1*c*, respectively. Spring washers 3*a*, 3*b*, and 3*c* are sandwiched between the screw-fixing nuts 2*a*, 2*b*, and 2*c* and the panel 4, respectively.

Figure 3A:
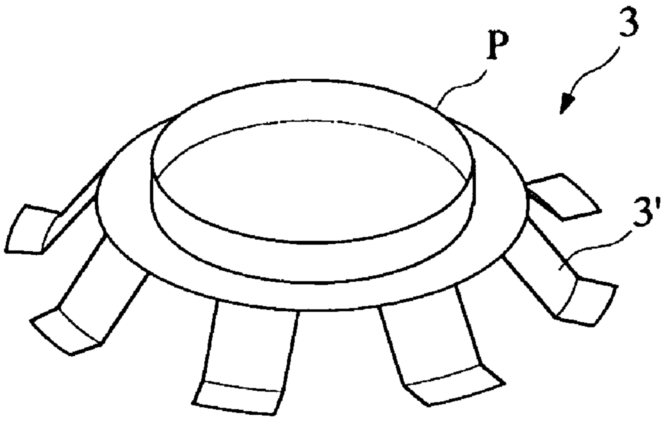
FIG. 3 shows a spring washer, a screw-fixing nut, and the assembly of them.
Figure 3B:
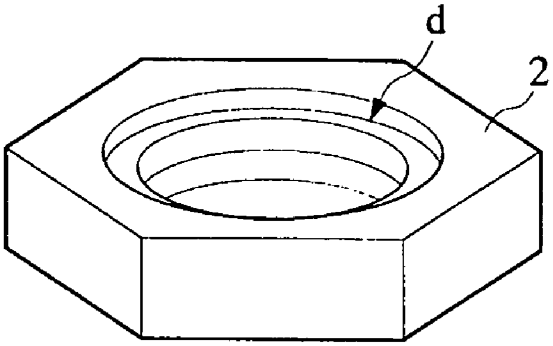
Figure 3C:
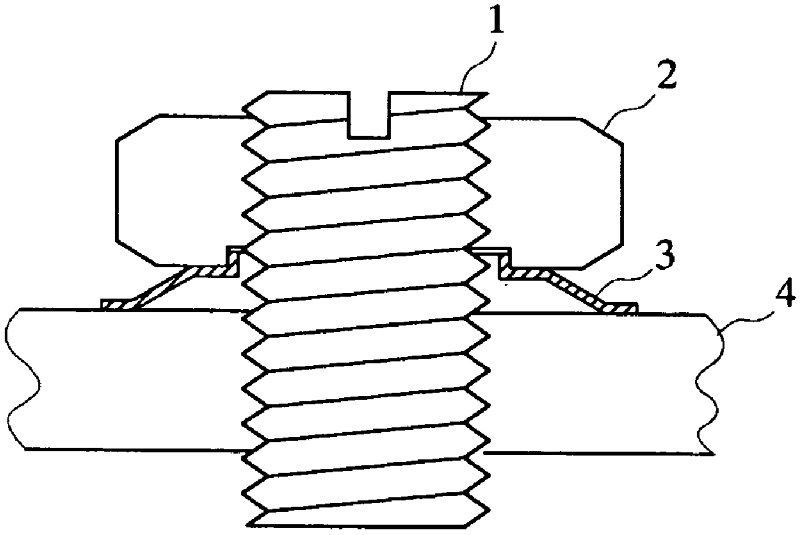

FIG. 3 shows a spring washer, a nut, and also, the state in which a characteristic adjusting screw is held by use of the spring washer and the nut. FIG. 3(A) is a perspective view of the spring washer 3. FIG. 2(B) is a perspective view of the screw-fixing nut 2. FIG. 3(C) is a cross-sectional view of the part of the characteristic-adjusting screw where the screw is held.

As shown in FIG. 3(A), a plurality of pieces 3' are formed on the spring washer 3 and come into contact with the panel 4. A convex portion p is formed so as to be protruded in the direction opposite to that of the pieces 3'. As shown in FIG. 3(B), a concave portion d is formed on the screw-fixing nut 2, and the convex portion p of the spring washer 3 is engaged with the concave portion p. In FIG. 3(B), the nut 2 is depicted in such a manner that the surface of the nut 2 in contact with the spring washer 3 is on the upper side thereof.

As shown in FIG. 3(C), the characteristic-adjusting nut 1 is screwed in the tapped hole formed in the panel 4. The characteristic-adjusting screw 1 is screwed in the screw fixing nut 2. The spring washer 3 is sandwiched between the screw-fixing nut 2 and the panel 4. In this state, the convex portion p of the spring washer 3 is engaged with the concave portion d of the screw-fixing nut 2, so that the positional variation in the radial direction of the spring washer 3 is suppressed, and also, the direction of a generated load applied to the spring washer 3 is coincident with the axis of the characteristic-adjusting screw 1.

As the above-described characteristic-adjusting screw 1, e.g., a screw of M4×0.5 (fine series thread) is employed. The spring washer 3 has an outer size of about 8 mm and a sheet-thickness of 0.15 mm, and is made of phosphor bronze. In particular, a sheet metal of phosphor bronze with a thickness of 0.15 mm is cut by press-forming or the like. The central portion of the cut sheet metal is burring-worked, so that the convex portion p is formed. Moreover, in this example, eight pieces 3' are formed so as to be protruded, and bent.

The screw fixing nut 2 is a hexagonal nut with an opposite side of 7 mm and a thickness of 2.5 mm. The concave portion d is formed by cutting or compression which is generally used.

As shown in FIG. 3(C), a groove is formed on the head of the characteristic-adjusting screw 1, and a minus driver is engaged with the groove. The protrusion-degree of the lower end of the characteristic-adjusting screw 1, at which the lower end is protruded into the cavity, can be adjusted by rotation of the driver on the axis of the screw.

In some cases in which the characteristic-adjusting screw 1 is turned in the state shown in FIG. 3(C), the screw-fixing nut 2 is turned together with the screw 1. This occurs in the case in which the frictional force of the part of the characteristic-adjusting screw 1 screwed in the screw-fixing nut 2 is larger than that between the screw-fixing nut 2 and the spring washer 3 and also than that between the spring washer 3 and the panel 4. Thus, an engaging member 6 shown in FIG. 1 is used. Engaging holes 11*a*, 11*b*, and 11*c* are formed in the engaging member 6 so that the screw-fixing nuts 2*a*, 2*b*, and 2*c* are engaged with the engaging holes 11*a*, 11*b*, and 11*c*, respectively. The engaging member 6 is placed on the upper surface of the panel 4 so that the screw-fixing nuts 2*a*, 2*b*, and 2*c* are engaged with the engaging holes 11*a*, 11*b*, and 11*c*, respectively. In this state, the characteristic-adjusting screws 1*a*, 1*b*, and 1*c* are turned, respectively.

If a turning-stopping member is provided coaxially with the driver for turning the characteristic-adjusting screw 1, the above-described engaging member 6 is not used, and the screw-fixing nut 2 is fixed by means of the turning-stopping member, it will be required to provide a torque detecting mechanism so that the load applied to the screw-fixing nut can be kept constant. On the other hand, according to the present invention, the adjustment of the characteristic can be performed stably and in a relatively wide range of the load obtained in the spring washer. That is, the characteristic-adjusting screw is not stuck, and the backlash of the screw can be absorbed. Thus, in the case in which the screw-fixing nut has a hexagonal shape, the nut can be manually set at a fixed angle equal to a multiple of 60° and can be engaged with the engaging member 6. Therefore, the whole device becomes simple, and the cost thereof can be reduced.

If the convex portion p of the spring washer 3 and the concave portion d of the screw fixing nut 2 shown in FIG. 3 are not provided, the spring washer 3 will be placed in an unbalanced position. Thus, loads applied to the spring washer 3, the screw-fixing nut 2, the characteristic-adjusting screw 1, and so forth become unbalanced. Thus, the characteristic-adjusting screws are arranged in unbalanced positions with respect to the panel 4 and become unstable, respectively. Moreover, if the sheet thickness of the spring washer 3 is smaller than the screw pitch, a part of the spring washer 3 will be fitted into the root of the screw. If the screw fixing nut 2 is tightened to obtain a suitable load, the following inconveniences will occur in some cases; the spring washer 3 rubs on the surface of the characteristic-adjusting screw 1 to damage the screw or to be engaged with the screw.

Regarding the spring washer 3, it is important to properly design a load which is caused by the elasticity thereof. If the load is excessively large, the torque required for turning of the characteristic-adjusting screw 1 will be increased proportionally to the excessive load. Thus, the turning mechanism and the major part of the resonator device behave as if they were elastic members. Accordingly, it becomes difficult to adjust the turning of the characteristic adjusting screw 1 by a slight-turning amount. On the contrary, if the load is excessively small, the backlash (unfitness) of the screw can not be completely absorbed, and the stability is deteriorated. Thus, the object can not be achieved.

Generally, if a screw is turned over a large distance, or a screw is inserted or extracted even in a small distance while an excessive load is applied to the screw, metals constituting the male and female screws will be stuck to each other, that is, a so-called "scuffing phenomena" occur. Thus, the function of the screw can not be carried out. In particular, in the resonator device, silver is plated on the surface of a screw made of brass, since the silver plating has a high workability, and gives a high electro-conductivity. For such soft metals, the above-described scuffing is much ready to occur. Moreover, the scuffing exerts a great influence, since no lubricant is used.

The results of the various experiments made by the inventors have revealed that the above-described scuffing does not occur, and also, the backlash can be sufficiently absorbed in the condition of a load of 10 N(1 kgf), that is, nearly 0.01 N·m (100 gf·cm) on a torque conversion basis.

Generally, the strengths of screws, which are used as clamping elements, are formulated. However, the relationship between clamping torques and generated axial forces depends on the friction coefficients of screw surfaces. The friction coefficient is a numerical value which is ready to be dispersed. Practically, the relationships are standardized depending on the individual concrete use-objects. According to JIS (Japanese Industrial Standard) B1083, which is an authorized standard, the yielding-point clamping axial forces of steel screws are listed in Reference Table 2. These values are utilized to calculate the standards for numerical values depending on the sizes of screws, although the uses and the materials of the screws are different from those of the specified screws. According to Reference Table 2, the clamping axial force is specified to be 2.0 kN (200 kgf) for M4 (coarse thread) and the strength grade of 4.8 assuming that the frictional coefficient is 0.2. In the embodiment of the present invention, the clamping torque is limited to be up to one twentieth of the specified one. That is, the clamping torque is specified to be 0.1 kN(10 kgf). This value is larger by one figure than that obtained as a result of the above-described experiment. It is estimated that If the clamping torque is larger than the value, phenomena unsuitable for the above-described fine adjustment will occur. Accordingly, this value is defined to be the upper limit of a generation load which occurs in the condition that the spring washer 3 is not pressed to be broken. In the case in which the names of screws are not applicable to the contents of the above-described Reference Table 2, or inconveniences exist in strength and so forth, the value should be calculated according to the calculation grounds specified in "General Rules" of JIS B1083.

The lower limit of the above-described clamping torque can not be defined, since the general stabilization can not be obtained by setting the lower limit. Accordingly, the lower limit is defined in the range in which the backlash can be absorbed and the adjustment of the characteristic can be stably performed.

When the adjustment of the characteristic is completed, the characteristic-adjusting screw 1 is fixed and prevented from being turned by means of a driver or the like. Simultaneously, the engaging member 6 is removed, and the screw-fixing nut 2 is tightened. In this case, the nut 2 is tightened by a torque at which the positional relationship between the characteristic-adjusting screw 1, the screw-fixing nut 2, and the panel 4 is prevented from being changed. Specifically, the nut 2 is tightened by a torque of about 0.5 Nm (5 kg·cm). In this case, a load considerably exceeding the elastic limit of the spring washer 3 is generated, so that the spring washer 3 is crushed to become a flat sheet. Then, the load, which is caused by the spring washer, becomes negligible.

In the case in which the characteristic-change per a unit rotational angle of the characteristic-adjusting screw is large (i.e., the adjusting sensitivity is high), that is, the characteristic is changed by a slight rotational change of the screw, it becomes a problem, in some cases, that the load applied to the spring washer is changed over a long period of time. According to the structure of the device of the present invention, such a problem can be prevented. Moreover, strong fixing is possible, so that the resistance to the ambient conditions, e.g., vibration, impact, and so forth can be enhanced.

Hereinafter, the structures of a resonator device according to a second embodiment of the present invention and a method of adjusting a characteristic of the resonator device will be described with reference to FIG. 4.

Figure 4A:
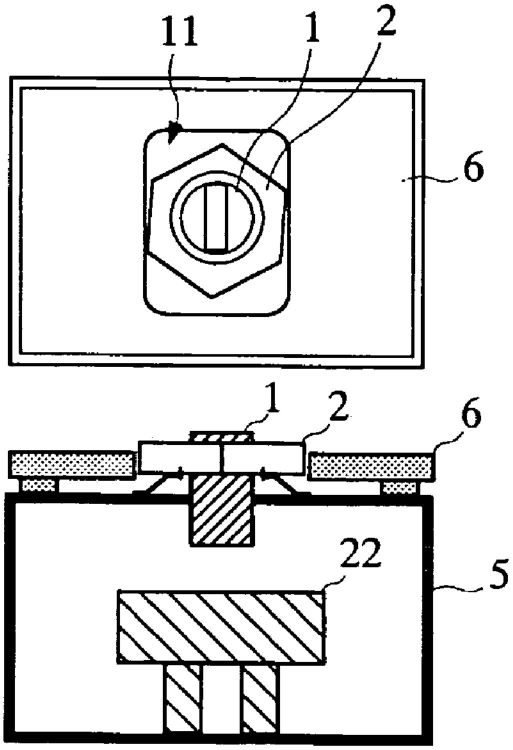
FIG. 4 shows the configurations of a resonator device according to a second embodiment.
Figure 4B:
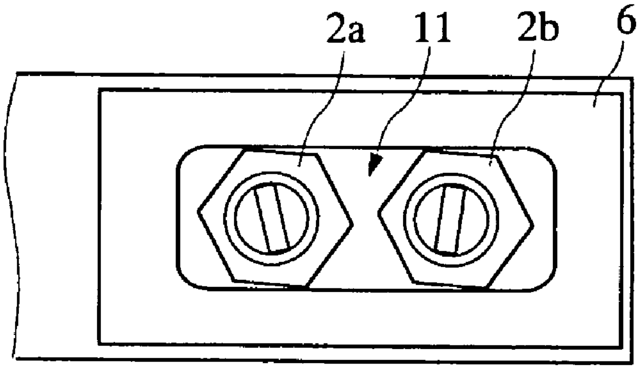
Figure 4C:
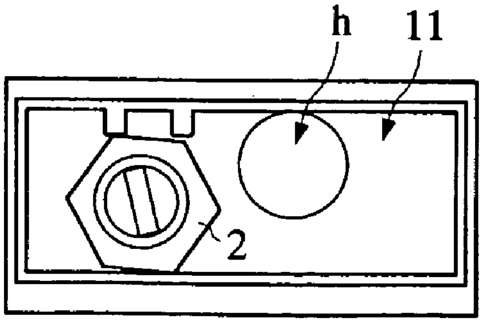

FIGS. 4(A), 4(B), and 4(C) show three resonator devices having different structures, respectively.

In an example of FIG. 4(A), a single columnar dielectric core 22 is arranged inside of the cavity 5 to form a TE01δ mode resonator. In this example, the engaging member 6 having a substantially rectangular engaging hole 11 is used, and two sides of the screw fixing nut 2 are engaged with the engaging hole 11.

In an example of FIG. 4(B), a continuous engaging hole 11 is formed, with which plural screw-fixing nuts 2*a* and 2*b* are engaged.

In an example of FIG. 4(C), the engaging hole 11 with which the screw fixing nut 2 is engaged is set to be so large that the adjusting hole h is prevented from being closed. In particular, an adjusting member is inserted inside of the cavity, e.g., to deform a coupling loop provided in the cavity so that the shape and the direction of the loop are changed. Thus, adjustment of the characteristic becomes possible.

Hereinafter, a method of adjusting a characteristic of the respective above-described resonator devices having a characteristic adjusting function will be described with reference to FIG. 5.

Figure 5:
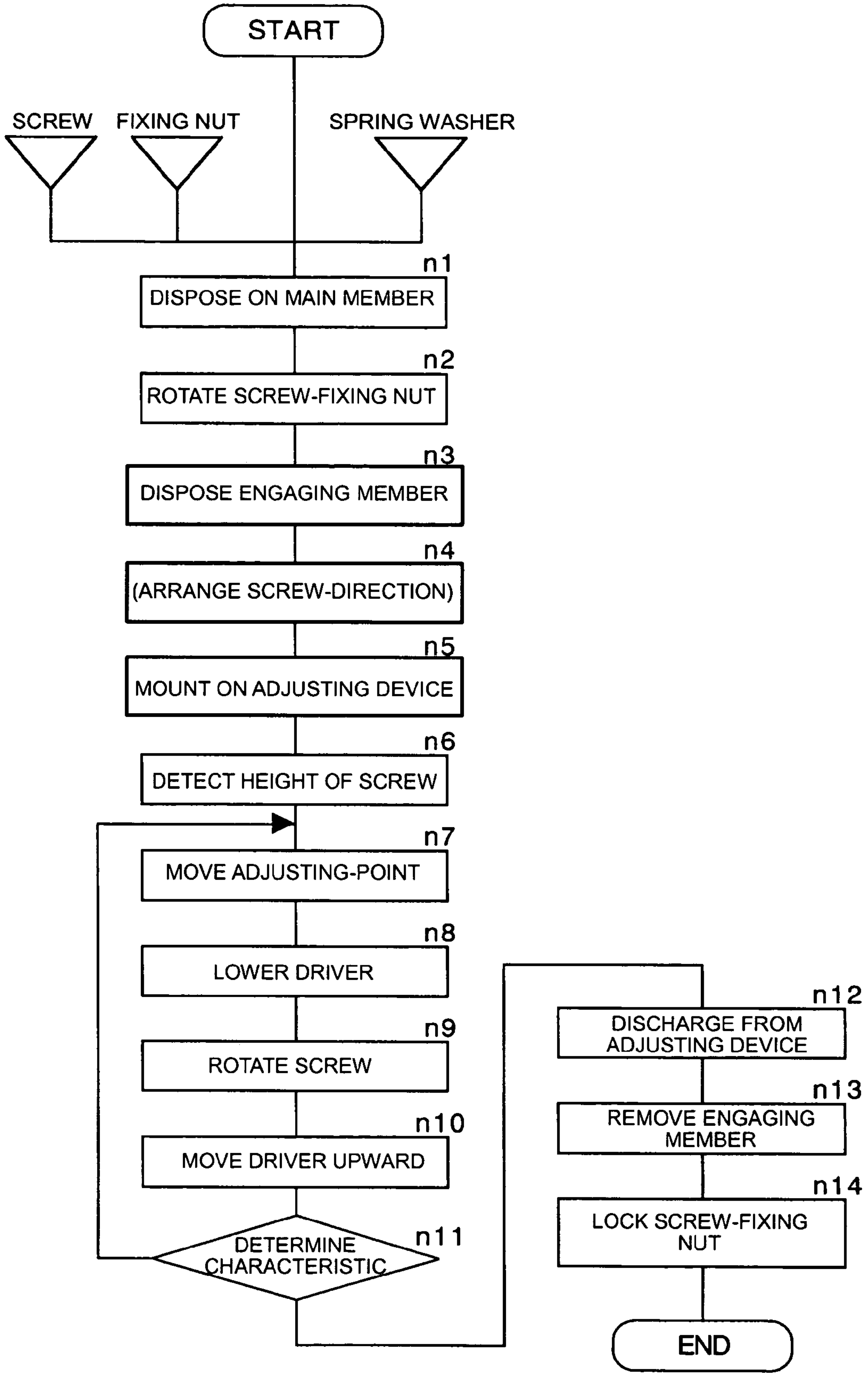
FIG. 5 is a flowchart showing the procedures of a method of adjusting a characteristic.

FIG. 5 is a flowchart showing procedures for adjustment of the characteristic. First, the characteristic-adjusting screw 1, the screw fixing nut 2, and the spring washer 3 are assembled in the main member of a resonator device (n1). Subsequently, the angle of the screw fixing nut is set to be equal to the rotational angle at which the nut is engaged with the engaging member 6 (n2). Then, the engaging member 6 is attached (n3). The driver-groove direction of the characteristic-adjusting screw 1 is set to be equal to the initial setting angle of the driver (n4). In this state, the resonator device is mounted on the characteristic-adjusting device (n5).

The characteristic-adjusting device detects the initial height of the characteristic-adjusting screw, and stores the initial height (n6). Thereafter, the driver is moved to the position to which the characteristic-adjusting screw is to be adjusted. Thus, the screw is lowered (n7 to n8). Subsequently, the characteristic-adjusting screw is turned by a predetermined rotational amount. Then, the driver is moved upward (n9 to n10).

Thereafter, the characteristic of the resonator device is measured. It is determined whether the characteristic is in a predetermined range or not. The above-described steps n7 to n11 are repeated till the characteristic is in the predetermined range. When the predetermined characteristic is obtained, the resonator device is discharged from the adjusting device (n12). The engaging member 6 is removed (n13). The screw-fixing nut is locked (n14). That is, the screw-fixing nut is tightened till the spring washer 3 is pressed and broken.

Hereinafter, the configurations of a filter, an oscillator, and a communication device each using the resonator device formed as described above will be described with reference to FIGS. 6 to 8.

Figure 6:
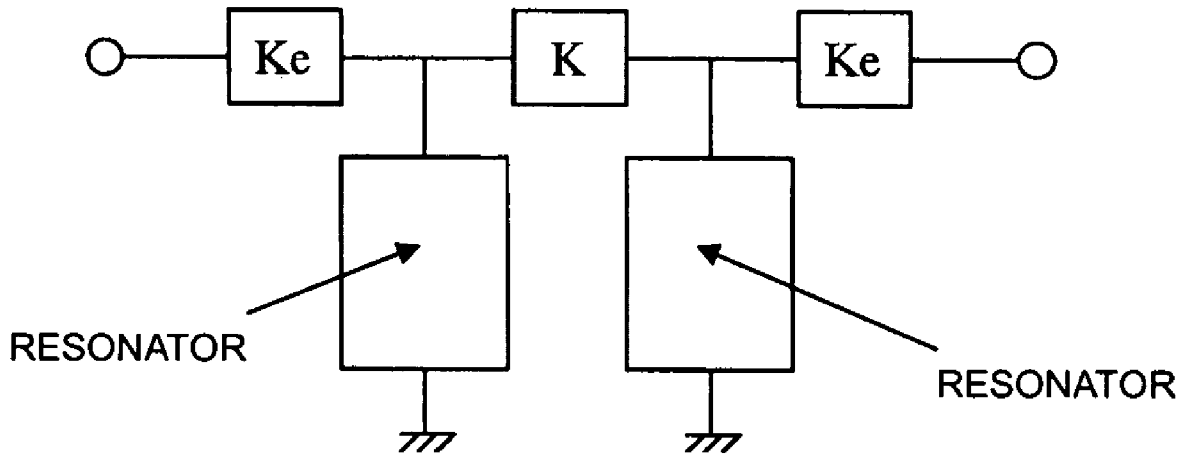
FIG. 6 is a block diagram showing the configuration of a filter.

FIG. 6 is a block diagram showing the configuration of the filter. In FIG. 6, a coupling element k is provided between two resonators, and coupling elements ke are provided between the resonators and external input-output units. For example, coupling loops to be coupled with magnetic fields in the resonance mode of the resonators are provided for inputting-outputting of a signal.

Figure 7:
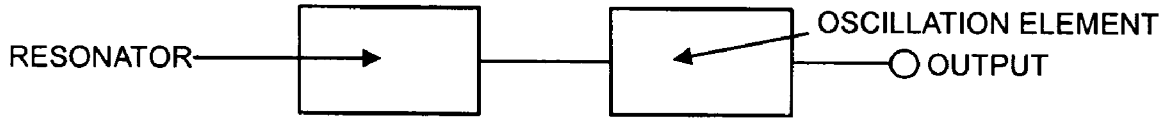
FIG. 7 is a block diagram showing the configuration of an oscillator.

FIG. 7 is a block diagram showing the configuration of an oscillator. In the oscillator, a resonator is coupled to an oscillation element which is a negative resistance element. Thus, the oscillator is caused to oscillate at the stable resonance frequency of the resonator, so that an oscillation output is obtained.

Figure 8:
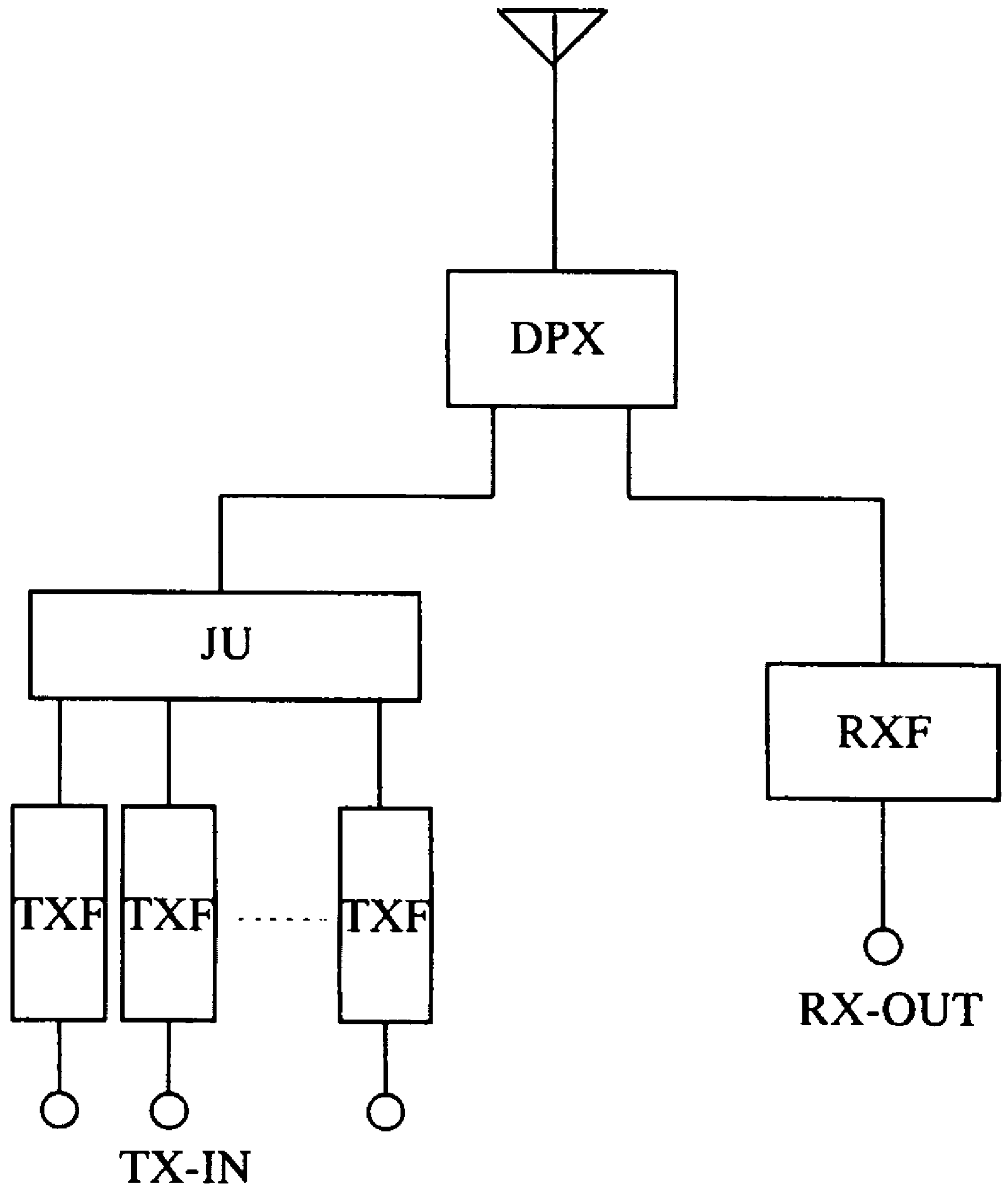
FIG. 8 is a block diagram showing the configuration of a communication device.

FIG. 8 is a block diagram showing the configuration of a communication device. The device comprises a duplexer DPX as an antenna duplexer, a reception filter RXF, a transmission filter TXF, and a junction unit JU. The transmission filter TXF causes a transmission signal in each channel to pass. The junction unit JU power-synthesizes the signals and outputs it to the duplexer DPX. The reception filter RXF causes a signal in the frequency band for the reception signal to pass, and blocks a signal in the frequency band for the transmission signal. Thereby, the communication device for use in a cellular base-station is formed. The oscillation circuit unit of a transmitter is provided with the above-described oscillator.

In the above-described embodiments, the resonator devices with the characteristic-adjusting screws are described. The present invention is not restricted on the embodiments. The present invention can be applied to the case in which a screw is screwed in a tapped hole formed in a member, and is desired to be held at a predetermined insertion or extraction position easily and securely.

In the above-described embodiments, a plurality of pieces having a spring property are provided for the spring washer. At least one piece having a spring property may be provided for the spring washer.

INDUSTRIAL APPLICABILITY

The screw-fixing implement of the present invention comprises a screw-fixing nut to be engaged with a screw screwed in a tapped hole formed in a member, the nut having a concave portion concaved in the thickness direction near the screw-axis, and a spring-washer having a piece with a spring-property which is in contact with the member, the spring-washer also having a convex portion engaged with the concave portion and being sandwiched between the member and the nut. Therefore, it is prevented that the spring washer is disposed in an unbalanced position, and thus, the load becomes unbalanced. Moreover, there are eliminated inconveniences in that a part of the spring washer is fitted into the root of the screw to damage the screwed surface or be engaged with the screw-surface. Thus, the screw can be held easily and securely at a predetermined insertion or extraction position.

Moreover, in the resonator device of the present invention, the device contains the screw-fixing implement, the member is a panel covering an opening of a cavity containing a resonator or a cavity of which the inside is a resonance space, and the screw is a characteristic-adjusting screw capable of approaching or being separated from the resonator, or capable of being inserted in or extracted from the resonance space of the cavity. Thus, there is obtained a resonance device of which the characteristic can be easily adjusted and which has a high reliability.

Moreover, according to the present invention, the engaging member is attached to be engaged with the outer periphery of the screw-fixing nut, and then, the characteristic-adjusting screw is turned. Thereby, the load by the spring washer can be kept constant. Thus, the adjustment of the characteristic can be performed with high stability.

Moreover, according to the present invention, after the adjustment of the characteristic, the nut is tightened till the spring washer is completely broken to be locked. Thereby, the resistance of a final product to its ambiences, e.g., impact, vibration, and so forth can be enhanced.

What is claimed is:

1. A screw-fixing implement comprising:

a screw-fixing nut to be engaged with a screw screwed in a tapped hole formed in a member, the nut having a concave portion concaved in a thickness direction of the nut; and a spring-washer having a plurality of radially-extending legs with a spring- property which are in contact with the member, the spring-washer also having a convex portion engaged with the concave portion of the nut and being sandwiched between the member and the nut.

2. A resonator device comprising the screw-fixing implement defined in claim 1, wherein the member is a panel covering an opening of a cavity containing a resonator or a cavity of which the inside is a resonance space, and the screw is a characteristic-adjusting screw capable of approaching or being separated from the resonator, or capable of being inserted in or extracted from the resonance space of the cavity.

3. A method of adjusting a characteristic of a resonator device, the resonator device including a screw-fixing implement comprising a screw-fixing nut to be engaged with a screw screwed in a tapped hole formed in a member, the nut having a concave portion concaved in a thickness direction of the nut, and a spring-washer having a plurality of radially-extending legs with a spring-property which are in contact with the member, the spring-washer also having a convex portion engaged with the concave portion of the nut and being sandwiched between the member and the nut, the method comprising:

adjusting the tightening torque of the nut so that a load applied to the washer is such that the characteristic-adjusting screw is not stuck, and the backlash of the screw can be absorbed; and in this state, turning the characteristic-adjusting screw.

4. A method of adjusting a characteristic of the resonator device defined in claim 3, wherein an engaging member is attached to be engaged with the outer periphery of the nut and suppress the nut from being turned, and the characteristic-adjusting screw is turned.

5. A method of adjusting a characteristic of the resonator device defined in claim 3, wherein after the adjustment of the characteristic, the nut is tightened till the spring washer is completely broken.

6. A filter having an external input-output means which is coupled to the resonator or the resonant space defined in claim 2.

7. An oscillator comprising an oscillation element which is coupled to the resonator or the resonant space defined in claim 2, and means of outputting an oscillation signal generated by the oscillation element.

8. A communication device having the filter defined in claim 6.

9. A communication device having the oscillator defined in claim 7.

10. A method of adjusting a characteristic of the resonator device defined in claim 4, wherein after the adjustment of the characteristic, the nut is tightened till the spring washer is completely broken.

* * * * *